(12) United States Patent
Sakaguchi et al.

(10) Patent No.: US 6,793,990 B1
(45) Date of Patent: Sep. 21, 2004

(54) METHOD OF MANUFACTURING GLASS PANEL AND GLASSPANEL MANUFACTURED BY THE METHOD

(75) Inventors: Koichi Sakaguchi, Osaka (JP); Shinjiro Domi, Osaka (JP); Shigeki Nakagaki, Osaka (JP); Katsuaki Suganuma, Ibaraki (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/936,861

(22) PCT Filed: Mar. 22, 2000

(86) PCT No.: PCT/JP00/01752
§ 371 (c)(1),
(2), (4) Date: Sep. 18, 2001

(87) PCT Pub. No.: WO00/58234
PCT Pub. Date: Oct. 5, 2000

(30) Foreign Application Priority Data

Mar. 25, 1999 (JP) .............................................. 11/82609
Jun. 11, 1999 (JP) ............................................. 11/165366

(51) Int. Cl.⁷ ............................. E06B 3/24; E04C 2/54; C03C 27/00

(52) U.S. Cl. .............................. 428/34; 428/77; 428/78; 52/786.1; 156/73.5; 156/73.6; 156/109

(58) Field of Search ........................... 428/34, 192, 77, 428/78, 213; 156/73.6, 73.5, 1.7, 109, 285, 286; 52/786.1

(56) References Cited

U.S. PATENT DOCUMENTS 5,227,206 A * 7/1993 Bachli .......................... 428/34

FOREIGN PATENT DOCUMENTS

| EP | 831073 | 3/1998 |
| JP | 2000119046 | 4/1920 |
| JP | 2000159552 | 6/1920 |
| JP | 43020098 | 8/1968 |
| JP | 11268934 | 10/1999 |

* cited by examiner

Primary Examiner—Donald J. Loney
(74) Attorney, Agent, or Firm—Fulbright & Jaworski L.L.P.

(57) ABSTRACT

A glass panel (P) including a pair of glass sheets (1A), (1B) disposed in a spaced relationship with each other with forming a gap (V) therebetween, characterized in that peripheral edges of the glass sheets (1A), (1B) are bonded directly by a single metal material (3) for sealing the gap (V) hermetically.

26 Claims, 7 Drawing Sheets

METHOD OF MANUFACTURING GLASS PANEL AND GLASSPANEL MANUFACTURED BY THE METHOD

TECHNICAL FIELD

The present invention relates to a glass panel including a pair of glass sheets with a gap being formed between opposing faces of the sheets and the gap being hermetically sealed by peripheral edges of the glass sheets. The invention relates also to a method of manufacturing such glass panel.

BACKGROUND ART

For a double glazing or glass panel having peripheral edge thereof sealed, it has been conventionally proposed to bond and seal the entire peripheral edges of the opposing faces of the pair of glass sheets by using metal material such as solder. However, the glass sheets generally do not directly wet with the molten metal material. For this reason, it has been a conventional practice to form, in advance, a metallic coating film having good wettability with the solder at bonding portions on the opposing faces of the pair of glass sheets and then to bond the solder with the glass sheets via such metallic coating film. As such soldering method and the manufacturing method of a bonded assembly of glass sheets utilizing the soldering method, various types of method are known.

For instance, Japanese laid-open patent publication (Kokai) No. Sho. 53-145833 discloses a multiple glazing including two or more glass sheets having metallized edge portions, metallized with e.g. copper coating, thereof soldered.

Further, Japanese laid-open patent publication (Kokai) No. Sho. 54-81324 discloses art of assembling respective components for forming an enclosure in hermetic manner, with at least one of the components being glass. In this, there is disclosed a method of bonding, by means of solder, portions to be bonded which portions have been metallized in advance by e.g. vapor evaporation process.

Still further, Japanese patent publication (Kokoku) No. Hei. 1-58065 discloses, as a high-airtight soldering multiple layer, a multiple layer consisting of a bottom layer, a middle layer and a top layer, which comprises Cu and NiCr films or the like formed on a surface of a base material such as glass.

Further, as the soldering methods, such methods have been attempted as inserting a metal element as an intermediate element between glass substrates having metallic coating films at bonding portions thereof and then bonding these glass substrates and the metallic element by means of solder or as coating solder in advance at the peripheral edges of the glass substrates having metallic coatings and then heating under pressure the substrates so as to bond them together. In either case, the solder employed contains a large amount of lead.

However, with those methods disclosed by the prior art, it has been difficult to obtain hermetically sealed glass panels with good reproducibility. Namely, with such glass panels soldered via the metallic coating films formed at the bonding portions of the glass sheets, sufficient mechanical strength can be obtained, but they are unsatisfactory in the respect of the hermetic seal. This is because of the presence of different material interfaces not only between the respective glass sheets and the solder, but also between the solder and the metal coating film as well as between the metal coating film and each glass sheet. The presence of such interfaces is very disadvantageous for hermetic seal.

Further, in actual manufacturing process, there tend to occur irregularities in the fused condition of the solder at the time of bonding. Because of this, it sometimes happens that the base soldering metallic coating film may be dissolved in the solder completely, thus resulting in insufficient bonding between the solder and the respective glass sheets or that oxidation may develop before the solder can wet the glass sheets, thus leading to deterioration in the hermetic seal.

Also, in the case of the method of bonding glass sheets pre-coated with solder, it is difficult to completely eliminate, at the time of bonding, any oxide dross present originally on the solder coating surface so as to preclude even microscopic inclusions thereon. For this reason, the bonding would be poor in terms of hermetic seal and unsatisfactory especially as vacuum seal.

In addition to the above, if solder with high lead content is employed, the lead may be eluted from the sealed portion of the glass panel when the panel is exposed under such environment as exposure to acid rain, so that there is the possibility of giving adverse effect to the environments.

As described above, the prior art has taught no specific requirements regarding the bonding condition between the glass sheets and the metal required for providing hermetic seal. In particular, it has been practically difficult to manufacture a relatively large glass panel such as one for use in a windowpane in a building. The present invention has been made to solve such problems. Its object is to provide a glass panel including a pair of glass sheets having their peripheral edges sealed in hermetic manner. Another object is provide a glass panel which is free from elution of lead, thus giving no adverse effect to the environments.

DISCLOSURE OF THE INVENTION

The characterizing features of a glass panel and its manufacturing method are as follows.

A glass panel, as shown in FIGS. 2 and 3, includes a pair of glass sheets disposed in a spaced relationship with each other with forming a gap therebetween, peripheral edges of the glass sheets being bonded directly by a single metal material for sealing the gap hermetically, characterized in that the panel satisfies the following relationship:

$$100 \leq T_L \leq (T_S - 100)$$

where $T_L$ is the liquidus temperature (° C.) of the metal material and $T_S$ is the strain point (° C.) of the glass sheets.

As is the case with the prior art described hereinbefore, when soldering metallic coating films are formed in advance on the peripheral edge of the pair of glass sheet and then metal material is applied between these metallic coating films, microscopic gaps which can serve as passages for gas molecules tend to be formed at such different material interfaces between the glass sheet surface and the metallic coating film and between the metallic coating film and the metal material.

On the other hand, according to the above construction of the invention, the bonding to the glass sheets employs a single metal material without using any soldering metallic film coatings. Therefore, it is possible to maintain airtightness at the peripheral edges of the glass sheets.

In the above, what is referred to as "direct bonding between the glass sheets and the metal material" as used in the concept of the present invention means that the only different material interface present is the interface between each glass sheet and the metal material. And, the term: "single metal material" refers to a single element metal or an alloy having a certain composition to be used alone between the pair of glass sheets. For instance, sealing by using two or more kinds of solder having different compositions from each other is obviously excluded from the scope of the invention. Also, a condition of any other substance than the metal material being present at the bonding portion is contrary to the concept of the invention. Namely, when solder-coated glass sheets are bonded by heating with each other, the inclusions originated from the oxides formed on the raw solder material is contained within the solder, tending to result in reduction in the air-tightness. Further, the residual substance such as flux commonly employed for preventing oxidation of solder must not be present at the bonding portions since it deteriorates the air-tightness. That is to say, the conventional method involving the preliminary formation of the metal coating film for solder welding and a glass panel obtained by such method are out of the scope of the present invention.

With the bonding technique of coating the glass sheet surfaces with solder in advance and then boding the sheets face to face, the oxides on each solder surface will remain to form a different material interface. Therefore, such technique too is out of the scope of the present invention. Namely, the method taught by the prior art is contrary to the concept of the present invention.

As described hereinbefore, the present invention is characterized in that the air-tightness is provided by direct bonding between the glass sheet and the single metal material. However, the scope of the present invention does not exclude presence of other metal material, inorganic material or organic material at or in the vicinity of the bonding portions. That is to say, it is possible to dispose in advance a wire element, powder or the like formed of other metal material than the sealing metal material at the bonding portions of the glass sheets and then to charge the sealing metal material at these bonding portions so that a certain component contained in the wire element, powder material or the like may dissolve into the sealing metal material for improving the bonding strength or to coat bonding portions with an inorganic material, organic material or the like for protection from the environment. These modified constructions are not contrary to the concept of the invention.

Then, the glass panel according to the invention is characterized in that the panel satisfies the following relationship:

$$100 \leq T_L \leq (T_S - 100)$$

where $T_L$ is the liquidus temperature (° C.) of the metal material and $T_S$ is the strain point (° C.) of the glass sheets.

Here, the term: "liquidus temperature $T_L$ of the metal material" refers to the temperature at which the metal completely becomes a liquid phase when heated from a lower temperature. Such temperature can be determined by the differential thermal analysis for instance.

Further, the term: "strain point $T_S$ of the glass sheet" refers to the temperature at which the glass has a viscosity of $4 \times 10^{14}$ (dPa.s) ($4 \times 10^{14}$ poise).

In general, the metal material is to be bonded with a glass sheet while the metal material is in its molten condition. Therefore, in order to avoid deformation of the glass sheet, it is desired that the liquidus temperature $T_L$ (° C.) be lower than the strain temperature $T_S$ (° C.) of the glass sheet to be bonded. With this, it becomes possible to effect the bonding within a temperature range where the deformation of the glass sheet is small. Further, in order to minimize the stress resultant from a difference in thermal expansion between the glass sheet and the metal material which stress can lead to breakage, it is desired that the bonding be effected at a lowest possible temperature. As a rule of thumb, it is preferred that $T_L$ be lower than $T_S$ by 100° C. or more. In its daily use, the glass panel can be heated to a considerably high temperature when exposed to a strong sunbeams during summer. In such case, if $T_L$ is too low, the strength will be reduced. For this reason, it is preferred that $T_L$ be higher than 100° C. It is more preferred that $T_L$ be higher than 150° C.

To summarize the above, the preferred relationship between the liquidus temperature $T_L$ (° C.) of the sealing metal material and the strain point $T_S$ (° C.) of the glass sheets to be bonded is: $100 \leq T_L \leq (T_S - 100)$. Then, the liquidus temperature of the metal material is adjusted so as to satisfy the above relationship by appropriate adjustment of the ratio of its components.

The glass panel according to a preferred embodiment is characterized in that the lead content in the metal material is below 0.1 wt. %.

With this construction, even when the glass panel is exposed to a severe environment such as exposure to acid rain, there occurs no elution of lead, thus providing no adverse effect to the environment.

The glass panel according to a preferred embodiment is characterized in that the metal material contains two or more kinds of components selected from a group consisting of Sn, Zn, Al, Si and Ti.

With this construction, the contained components and oxygen present on the glass sheet surfaces will be bonded to each other to improve the bonding strength.

As the metal material to be used at the bonding portions according to the present invention, solder having the above-defined components and range of composition may be cited. More preferred range of composition and the reasons thereof are as follows. In the following discussion, the compositions and component ratios are represented as weight %.

Sn is non-toxic and provides the function of providing wettability to the object to be bonded.

Zn provides a bonding force to oxide materials such as glass, ceramics, etc. If the addition amount of Zn is too large, there occurs increasing tendency of brittleness of the solder, hence not desirable for actual use. The preferred range of its addition amount is 0.5~10%.

The binary system of Sn and Zn is an eutectic system. With eutectic composition, the composition can easily become an alloy having fine structure by cooling from its molten condition. The eutectic point corresponds to the composition of Sn 91% and Zn 9%. At its eutectic temperature 198° C., a liquid phase and two solid phases of Sn and Zn coexist. This eutectic composition can easily become a fine metal structure by cooling and solidifying, as described above. So that, this composition is flexible, thus being advantageous for relaxing stress generated in the course of the bonding operation with the glass sheets, thus improving the bonding strength. Accordingly, it is preferred that the solder contain Sn and Zn in a ratio approximating such eutectic composition thereof. In particular, it is preferred that Zn be present at 8 to 10% relative to the sum of Sn and Zn.

Al is an element which can be oxidized very easily, but it provides the advantageous effect of being readily bonded with an oxide. Such effect will be low if the addition amount of Al is below 0.001%. Whereas, if it exceeds 3.0%, this will result in increase in the hardness of the solder per se. Hence, it becomes difficult to ensure heat-cycle resistance and the melting point will rise to deteriorate the workability. Then, the preferred range of its addition amount is 0.001 to 1.0%.

Si is also an element which can be oxidized very easily, but it provides the advantageous effect of being readily bonded with an oxide. With a small addition amount, it will be effective for rendering the metal structure finer during the cooling/solidifying process, so as to increase the flexibility of the solder. This effect will be low if the addition amount of Si is below 0.001%. Whereas, if it exceeds 3.0%, this will result in increase in the hardness of the solder per se. Hence, it becomes difficult to ensure heat-cycle resistance and the melting point will rise to deteriorate the workability. Then, the preferred range of its addition amount is 0.001 to 1.0%.

Ti is also an element which can be oxidized very easily, but it provides the advantageous effect of being readily bonded with an oxide. Further, since Ti has a large oxygen solubility, it is effective for causing the solder to contain oxygen. That is, with Ti, it becomes possible for the solder to contain oxygen in the form of Ti—O, without elution of oxides. And, this oxygen promotes the formation of bonding to the glass, as will be detailed later. This effect will be low if the addition amount of Ti is below 0.001%. Whereas, if it exceeds 3.0%, this will result in increase in the hardness of the solder per se. Hence, it becomes difficult to ensure heat-cycle resistance and the melting point will rise to deteriorate the workability. Then, the preferred range of its addition amount is 0.001 to 1.0%.

The glass panel according to a preferred embodiment is characterized in that the metal material contains O (oxygen) in the range from 0.0001 to 1.5 wt. %.

For instance, by the presence of oxygen in the dissolved form within the metal material, it is possible to promote the formation of the bonding at the interface between the glass sheet and the metal material. In order to cause the metal material to contain oxygen, this is possible by either or both of melting and producing the metal material in an oxygen-containing atmosphere and carrying out the bonding with the glass sheets in an oxygen-containing atmosphere.

Oxygen is a component which promotes bonding between the metal material and the glass. With oxygen being present in an dissolved form within the metal material, at the interface between the glass and the metal material, the transition from the oxide bonding to the metal bonding can occur smoothly, thereby to reinforce the bonding interface. This effect will be low if the oxygen concentration is too low. On the other hand, if the concentration is too high, this will tend to invite elution of oxide in the metal material. Then, the oxygen concentration should preferably be 0.0001% or higher, more preferably 0.001% or higher, and yet preferably should range between 0.001 and 1.5%. The preparation of such oxygen-containing metal material is possible by melting the metal material in an oxygen-containing atmosphere, e.g. an ambient atmosphere. And, its oxygen content can be increased or decreased by appropriately adjusting the melting temperature, period, etc. Further, even if the metal material does not contain oxygen before it is used for the bonding operation, the metal material after the bonding operation may contain a preferred concentration of oxygen by appropriately adjusting the atmosphere in which the bonding is carried out. In such case, substantially same high bonding strength may be obtained as use of the oxygen-containing metal material.

The glass panel according to a preferred embodiment as illustrated in FIGS. 4–8, is characterized in that the pair of glass sheets have different dimensions so that one glass sheet is disposed in opposition to the other glass sheet with the one sheet projecting at a peripheral edge thereof by a width of 1 to 10 mm from each peripheral edge of the other sheet, with the metal material being charged from the projecting portion of the one glass sheet into the gap between the glass sheets.

With this construction, not only the gap but also the end faces of the glass sheets can contribute to the bonding, whereby the bonding strength may be improved.

The glass panel according to a preferred embodiment is characterized in that the gap is sealed to keep a depressurized condition.

With this construction, it is possible to reduce the thermal conductance, whereby a glass panel having superior heat insulating performance may be obtained.

A method of manufacturing a glass panel according to a preferred embodiment as illustrated in FIG. 1, is characterized by the steps of: disposing spacers between the pair of glass sheets to form a gap therebetween; charging a molten single metal material to the peripheral edges of the glass sheets, the metal material satisfying the following relationship:

$$100 \leq T_L \leq (T_S - 100)$$

where $T_L$ is the liquidus temperature (° C.) of the metal material and $T_S$ is the strain point (° C.) of the glass sheets; and directly bonding the glass sheets and the metal material together so as to seal the gap hermetically.

With the conventional method, e.g. a metal coating film for bonding with molten solder is provided on the surface of each glass sheet for sealing bond. In such case, a number of different material interfaces exist between the glass sheet surface and the metal coating film, between the metal coating film and the solder, etc.

On the other hand, in the case of the invention's method in which a single metal material is charged to the peripheral edges of the glass sheets, only two different material interfaces are present, so that its number can be minimized. Accordingly, microscopic gaps will hardly be formed at the different material interfaces, whereby the reliability of the air-tightness at the peripheral edges of the glass sheets may be improved.

In the above, in "charging the molten metal material to the peripheral edges of the glass sheets", it is important that the glass sheets and the metal material be bonded directly with each other. Any oxide generated when the molten metal material comes into contact with an oxygen-containing atmosphere is present on the bonding interface, this will result in reduction in bonding strength, making it difficult for the assembly to withstand its evacuated air-tightness as well. For this reason, such oxides must be eliminated as much as possible.

And, in this method, the method employs the metal material which satisfies the following relationship:

$$100 \leq T_L \leq (T_S - 100)$$

where $T_L$ is the liquidus temperature (° C.) of the metal material and $T_S$ is the strain point (° C.) of the glass sheets. Then, in bonding the molten metal material with the glass sheets, it is possible to prevent deformation in the glass sheets. Further, by minimizing the stress occurring from a difference in thermal expansion between the glass sheets and the metal material, it is possible to prevent breakage of the glass sheets also.

The method of manufacturing a glass panel according to a preferred embodiment is characterized by the steps of: heating and maintaining the pair of glass sheets at a temperature below the liquidus temperature of the metal material, the molten metal material having a portion coming into contact with an atmosphere and a further portion not coming into contact with the atmosphere before the metal material is charged into the gap between the glass sheets; and charging into the gap at the peripheral edge of the glass sheets only the portion of the metal material which did not come into contact with the atmosphere, while preventing the portion which came into contact with the atmosphere from being charged into the gap.

With the above method, by heating the glass sheets to a temperature below the liquidus temperature of the metal material, the wettability of the glass sheets may be improved for facilitating the charging operation of the metal material.

Further, the reason for the prevention of the portion which came into contact with the atmosphere from being charged into the gap is as follows.

Namely, if the metal material contains a component having a large affinity relative to oxygen, even a small amount of oxygen in the atmosphere can cause development of oxidation in the metal material. For this reason, it will become necessary in general to carry out the bonding operation with the glass sheets in an inert atmosphere or under a depressurized condition. In this, according to the invention's method, only the inner portion of the metal material coated with oxides is caused to permeate into the gap, thereby to prevent the oxides formed on the surface thereof from entering the bonding portion.

The method of manufacturing a glass panel according to a preferred embodiment as shown in e.g. FIGS. 11 and 12, is characterized that the step of charging the molten metal material into the gap between the glass sheets employs a guide for guiding the metal material to the gap, at least a portion of the guide being inserted into the gap.

In the above, the "guide" refers to a member adapted for guiding the molten metal material from an outlet of its feeding device to the gap between the glass sheets. The molten metal material is guided to the target position by its wetting with the guide as well as by the restriction of its flow by the shape of the guide.

With the method described above, as the guide is provided, the introduction of the metal material into the gap, which tends to be difficult in the case of a narrow gap, can be promoted and facilitated, and the introducing speed may be increased, so that the above-described direct bonding between the metal material and the glass sheets may be formed easily.

The method of manufacturing a glass panel according to a preferred embodiment, as shown in e.g. FIGS. 11 and 12, is characterized in that the guide is a plate-like or bar-like guide.

With the guide having such shape as above, by appropriately setting e.g. the thickness of its plate-like portion or the diameter of its bar-like portion, this guide may be inserted into the gap, regardless of the size of this gap between the pair of glass sheets. Accordingly, the charging operation of the metal material may be carried out in a reliable manner.

The manufacturing method of a glass panel according to a preferred embodiment, as shown in e.g. FIGS. 13 through 16, is characterized in that the method employs a stimulus conducting member for physically stimulating the interface between the molten metal material and the glass sheet surface so as to promote the direct bonding therebetween, at least a portion of the stimulus conducting member being inserted into the gap.

In the above, the "stimulus conducting member" refers to a member capable of conducting a physical stimulus to the molten metal material of the gap. By applying a physical stimulus to the molten metal material, any oxides etc. which can interfere with the direct bonding at the interface between the metal material and the glass can be eliminated forcefully, so that a more firm and dense bonding interface suitable for the hermetic sealing may be obtained.

The manufacturing method of a glass panel according to a preferred embodiment, as shown in e.g. FIGS. 13 through 16, is characterized in that the stimulus conducting member is a plate-like or bar-like member.

As described above in connection with a preferred embodiment, with the stimulus conducting member having such shape as above, by appropriately setting e.g. the thickness of its plate-like portion or the diameter of its bar-like portion, a portion of this member may be inserted into the gap, so that the physical stimulus for promoting the direct bonding at the interface between the metal material charged at the gap and the glass may be applied in an efficient and effective manner.

The manufacturing method of a glass panel according to a preferred embodiment, as shown in e.g. FIGS. 13 through 16, is characterized in that the physical stimulus for promoting the direct bonding is provided by mechanical movement of the stimulus conducting member.

In general, the molten metal material to be charged into the gap has a certain viscosity. Then, with the method of the invention in which the stimulus conducting member inserted into the gap is mechanically moved, the metal material charged into the gap is forcibly moved, so that the physical stimulus for promoting the direct bonding at the interface with the glass can be applied in an efficient and effective manner.

The method of manufacturing a glass panel according to a preferred embodiment, is characterized in that unevenness is provided on a surface of the stimulus conducting member.

In the above "unevenness" includes grooves and projections. With this unevenness, the interface between the molten metal material and the glass may be effectively renewed. For instance, as the friction between this stimulus conducting member and the molten metal material is improved thus further increasing the physical stimulus, the molten metal material may be stirred strongly. As a result, it is possible to forcibly eliminate oxides of the metal material which would otherwise tend to remain at the interfaces.

Further, if the stimulus conducting member and the glass come into contact with each other so that the molten metal material is charged while rubbing also the surface of the glass sheet, the physical stimulus is further increased and the components of the metal material and the components of the glass can come into more direct contact with each other. So that the bonding will become stronger and denser, thus contributing to formation of superior bonding interface therebetween.

The manufacturing method of a glass panel according to a preferred embodiment, as shown in FIGS. 11–16, is characterized in that the guide and/or stimulus conducting member is moved along the gap.

With the above method, the peripheral edge of a glass panel having a long side may be sealed easily.

Also, in the case of such movement of the stimulus conducting member, this mechanical movement of the stimulus conducting member can also serve as physical stimulus for promoting the direct bonding.

The manufacturing method of a glass panel according to a preferred embodiment is characterized in that the mechanical movement of the stimulus conducting member is at least either of rotation and vibration. If the mechanical movement to be applied is either rotation or vibration, this makes it easier to make the device. The, with using such simple device, the peripheral edge of the glass panel may be sealed reliably.

The manufacturing method of a glass panel according to a preferred embodiment is characterized in that at least one of the guide and the stimulus conducting member is made of a metal material.

If the guide or the stimulus conducting member is formed of a metal material as above, a guide or stimulus conducting member having desired strength, corrosion resistance, etc., may be obtained easily.

Incidentally, the guide or the stimulus conducting member may be formed alternatively of ceramics etc, depending on the necessity.

The manufacturing method of a glass panel according to a preferred embodiment, is characterized in that the guide and the stimulus conducting member are provided as a single member having the functions of both of them.

With this method, the molten metal material may be easily inserted into the gap and also the bonding interface between the glass sheets and the molten metal material may be formed efficiently.

The manufacturing method of a glass panel according to a preferred embodiment, as shown in FIGS. 4–8, is characterized in that the pair of glass sheets have different dimensions from each other and one glass sheet is disposed in opposition to the other glass sheet with a peripheral edge of the former projecting from a peripheral edge of the latter by a width of 1 mm through 10 mm, and the metal material is charged from the projecting portion of the one glass sheet toward the gap by utilizing capillary phenomenon.

With this method, by disposing one glass sheet on the lower side, the molten metal material can be introduced into the gap via the projecting portion. Hence, the charging operation of the molten metal material may be facilitated.

The manufacturing method of a glass panel according to a preferred embodiment, as shown in FIGS. 17 and 18, is characterized in that the pair of glass sheets are heated and maintained at a temperature below the liquidus temperature of the metal material and under this condition, vibration is applied to at least one of the molten metal material or the glass sheet, so as to cause the material to permeate and to be charged into the gap by utilizing capillary phenomenon.

That is, with the above method, the molten metal material with its wettability to the glass sheets improved by the application of vibration thereto is caused to permeate, by its own force commonly referred to as capillary phenomenon, into the peripheral edge to fill the gap. With this method, the formation of the dissimilar material interface which would occur with the prior art described hereinbefore can be minimized, so as to achieve a favorable condition for air-tightness. As a method of applying vibration, in addition to the method of placing the vibrating member in direct contact with the molten metal material for applying or applying the vibration to the glass sheets, it is also possible to vibrate the metal material without physical contact by means of e.g. electromagnetic induction.

Incidentally, by heating the glass sheets, the wettability between the molten metal material and the glass sheets may be improved; hence, the permeation/charging of the metal material into the gap is promoted to improve the reliability of the hermetic sealing.

The manufacturing method of a glass panel according to a preferred embodiment, is characterized in that the vibration includes two or more kinds of frequencies and either one or both of them is/are applied to at least one of the metal material and the glass sheet.

The degree of the capillary phenomenon of the molten metal material relative to the gap is believed to vary, depending on such factors as the temperature of the molten metal material, the size of the gap, etc. With the capillary phenomenon in general, the smaller the gap, the greater the force which urges the liquid to enter it. On the other hand, this will reduce the cross section area of the area (inlet) through which the liquid enters the gap, thus increasing the resistance at this area. Then, by providing two or more kinds of frequencies, it is possible to obtain a good balance between the permeating force and the resistance at the inlet, thus allowing the capillary phenomenon to take place in a most efficient manner, thereby stabilizing the permeation of the molten metal material into the gap.

The manufacturing method of a glass panel according to a preferred embodiment, is characterized in that the two or more kinds of vibrations having different frequencies of either a low frequency of 1 Hz to 10 kHz or a supersonic frequency of 15 to 100 kHz.

With the above method, by applying the low frequency vibration of 1 Hz to 10 kHz, the resistance at the inlet encountered by the molten metal material to permeate into the gap may be reduced, so that the material may permeate into the gap in an efficient manner.

Further, by applying the supersonic frequency of 15 kHz to 100 kHz, it is possible to restrict formation of the oxide coating film of the metal material at the bonding interface.

Incidentally, when the frequency of the vibration to be applied is 15 kHz to 100 kHz, the favorable effect can be achieved as described above. With a range over 15 kHz, the formation of oxide coating film of the metal material at the bonding interface may be restricted, so that a satisfactory performance for practical use may be obtained and the device may be inexpensive and easy to handle. To be more specific, the most preferred range is 15 kHz to 80 kHz.

Further, if vibration ranging between 800 kHz and 10 MHz, this will be effective for improving the adherence between the metal material and the glass sheet, whereby even denser and stronger bonding interface may be obtained.

The manufacturing method of a glass panel according to a preferred embodiment is characterized in that the metal material has a lead content below 0.1 wt. %.

With this method, even when the glass panel is exposed to a severe environment such as acid rain, no elution of lead will occur. So that, it is possible to obtain a glass panel which does not give any adverse effect to the environment.

The manufacturing method of a glass panel according to a preferred embodiment is characterized in that the metal material contains two or more kinds of components selected from a group consisting of Sn, Zn, Al, Si and Ti.

With this method, the contained components and oxygen present on the glass sheet surfaces will be bonded to each other to improve the bonding strength.

The manufacturing method of a glass panel according to a preferred embodiment is characterized in that the metal material contains O (oxygen) in the range from 0.0001 to 1.5 wt. %.

With this method, by the presence of oxygen in the dissolved form within the metal material, it is possible to promote the formation of the bonding at the interface between the glass sheet and the metal material.

The manufacturing method of a glass panel according to a preferred embodiment is characterized in that the gap is sealed to keep a depressurized condition.

With this method, it is possible to reduce the thermal conduction, whereby a glass panel having superior heat insulating performance may be obtained.

BEST MODE OF EMBODYING THE INVENTION

Next, embodiments of the present invention will be described with reference to the accompanying drawings.

(First Embodiment)

Figure 1:
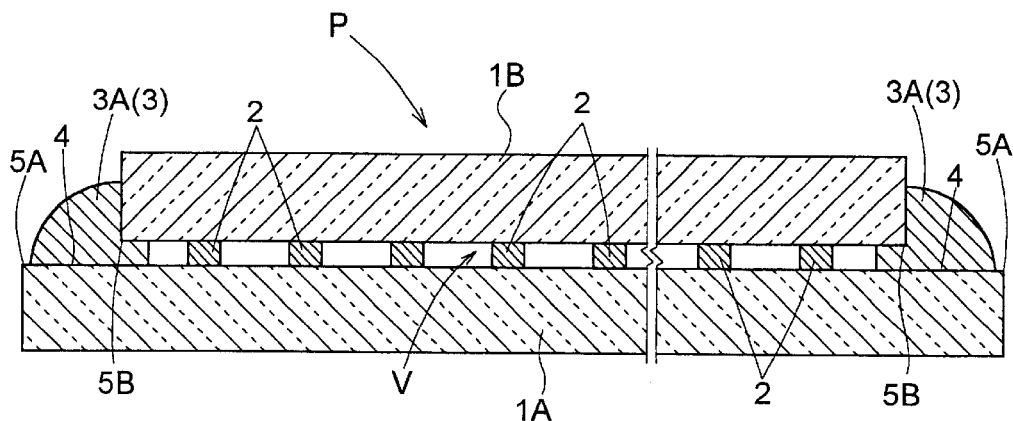
FIG. 1 is a section view of a glass panel relating to a first embodiment.

FIG. 1 is a section view showing a glass panel P including a pair of glass sheets 1A, 1B disposed with their main surfaces in spaced opposition to each other via a plurality of pillars 2 herebetween so as to form a gap V between the glass sheets 1A, 1B, with peripheral edges of the glass sheets 1A, 1B being bonded with a metal material 3 to seal the gap V.

Each of the glass sheets 1A, 1B is a transparent float plate glass having a thickness of about 3 mm. In this embodiment shown in FIG. 1, one glass sheet 1A has outer dimensions slightly greater than the other glass sheet 1B so that peripheral edges 5A of the former project from peripheral edges 5B of the latter along the entire periphery thereof when these glass sheets 1A, 1B are disposed with their main surfaces being in opposition to each other.

The gap V is constructed to realize a depressurized condition ($1.0 \times 10^{-2}$ (Pa) or lower) therein by e.g. evacuating the gap V after formation of this gap V between the glass sheets 1A, 1B.

As the metal material 3 to be employed at the bonding portion according to the invention, it is preferred that this material contains Sn, Zn, Al, Si, Ti, O, etc, as described hereinbefore.

However, in addition to the above, it is also possible to employ solder 3A having components and composition range to be described next. In the following description, the unit of representing the compositions and component ratios is weight %.

Cu, if added, achieves distinguished effect for improving the mechanical strength of the solder 3A. If the addition amount of Cu exceeds 9%, this will raise the melting point and also result in generation of a large amount of intermetallic compound with Sn, which in turn leads to reduction in the mechanical strength. Then, the more preferred range of its addition amount is from 0.001% to 1.0%.

In addition to the components described above, appropriate amounts of In, Ag, Bi and Sb may be added also.

In not only lowers the melting point of the solder 3A, but also improves its wettability, and softens the solder 3A itself. If the addition amount of In is below 0.1%, such effect will be low. If it exceeds 50%, on the contrary, it becomes difficult to ensure sufficient strength of the solder 3A itself and it also invites considerable cost increase.

Ag if added, like Cu described above, achieves a distinguished effect for improvement of the mechanical strength of the solder 3A. If the addition amount of Ag is below 0.1%, the effect will be too low to obtain any improvement of the mechanical strength. If it exceeds 6%, this will raise the melting point, like Cu, and also will result in generation of a large amount of intermetallic compound with Sn, thereby to invite reduction in the mechanical strength on the contrary. The more preferred range of its addition amount is from 0.1% to 3.5%.

One or more kind of Bi and Sb may be added appropriately by a range of 10% or less. Bi can improve the wettability of the solder 3A. Sb can improve the appearance of the solder 3A applied and can also increase the creep resistance. Further, other elements such as Fe, Ni, Co, Ga, Ge, P, etc, if added by a trace amount, can improve the performance of the solder 3A, i.e. its leadless property, the applicability of the solder 3A, and the mechanical strength.

An example of the composition of the metal material 3 suitable for the present invention contains 0.001–3.0% of Ti, 0–3.0% of Al, 0–3.0% of Si, 0–9.0% of Cu, 72–99.9% of Sn, 0.1–10.0% of Zn and not more than 0.1% or substantially zero % of Pb.

As a more preferred example of the composition of the metal material 3, it is proposed, in the composition of the above-defined ranges, that the ratio of Zn relative to the sum of the Sn and Zn is from 8% to 10%.

Figure 2:
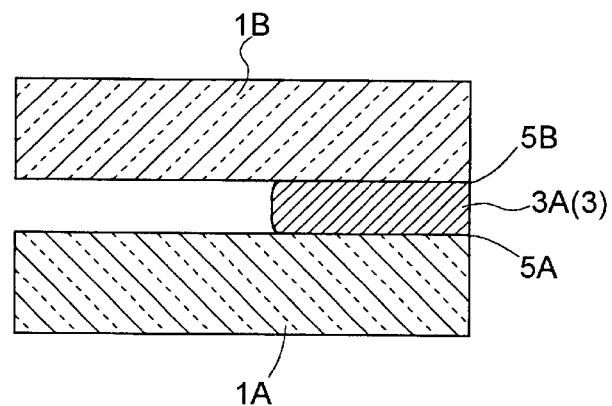
FIGS. 2 and 3 are partial section views showing a sealing portion relating to the first embodiment.
Figure 3:
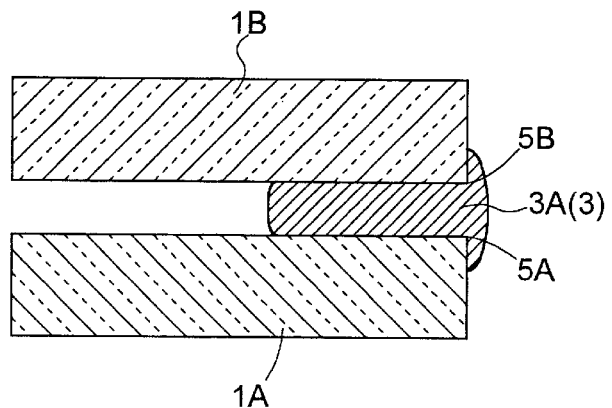

FIGS. 2 and 3 are partial sections showing the sealed portion using the metal material 3. As shown, edges 5A, 5B of the glass sheets 1A, 1B are superposed in alignment with each other and under this condition, the metal material 3 is charged between opposing faces of the glass sheets 1A, 1B. In this manner, in the case of the construction of FIG. 2, the metal material 3 is charged over a constant width including at least the edges 4A of the opposing faces of the glass sheets 1A, 1B.

For maintaining the air-tightness at the peripheral edge, it is important that the metal material 3 be formed from the edges of the opposing faces of the glass sheets 1A, 1B. That is, microscopic gaps which can act as passage for gas molecules tend to be formed at the interfaces between the metal material 3 and the glass sheets 1A, 1B. In particular, such deterioration in the interfaces tend to occur from exposed portions of the interfaces. In order to restrict this, the metal material 3 and the glass sheets 1A, 1B should be bonded in such a manner that no stress concentration occur at the interfaces when an external force is applied to remove the metal material 3 and the glass sheets 1A, 1B from each other. Accordingly, it is important that the bonding of the metal material 3 be effected including the edges of the opposing faces of the glass sheets 1A, 1B.

(Second Embodiment)

Figure 4:
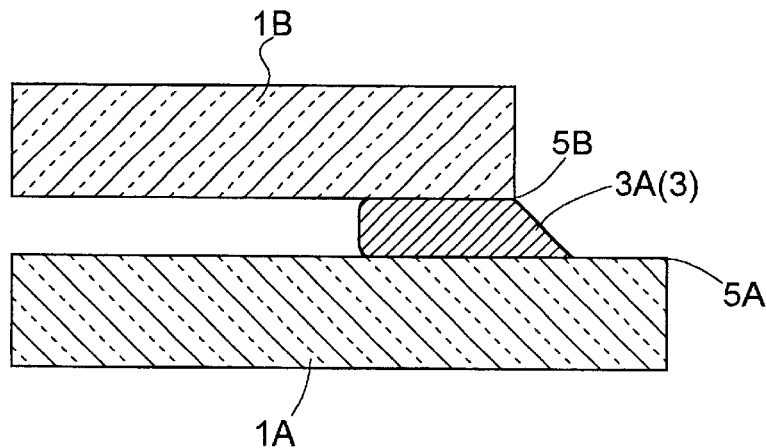
FIGS. 4 and 5 are partial section views showing a sealing portion relating to a second embodiment.
Figure 5:
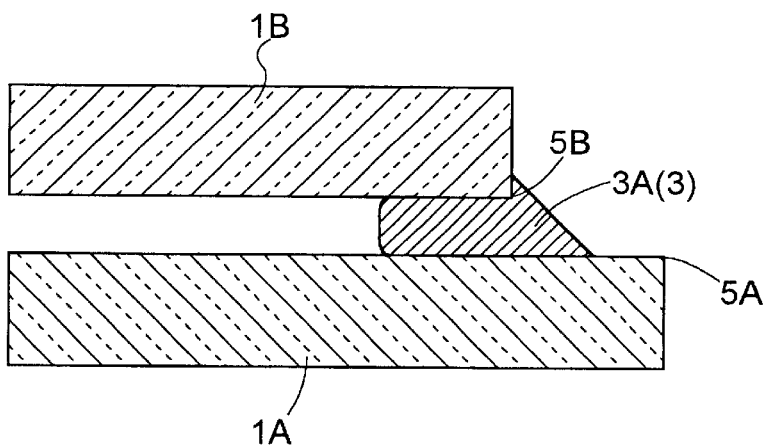

FIGS. 4 and 5 also are partial sections showing bonding portion using the metal material 3. In this case, the glass sheets 1A, 1B are superposed with the edge 5A of the lower glass sheet 1A projecting beyond the edge 5B of the upper glass sheet 1B. Under this condition, the metal material 3 is charged between the opposing faces of the glass sheets 1A, 1B. In this manner, in the case of the construction of FIGS.

4 and 5, the metal material 3 is charged over a constant width, including at least the edge 5B of the opposing face of the glass sheet 1B.

(Third Embodiment)

Figure 6:
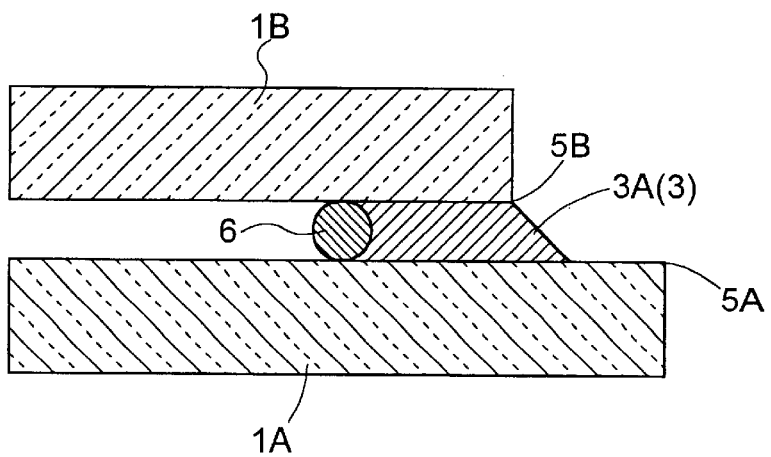
FIG. 6 is a partial section view showing a sealing portion relating to a third embodiment.

In FIG. 6, a wire member 6 acting also as a spacer is disposed at the bonding portion between the two glass sheets 1A, 1B. This wire member 6 is made of a different material from the metal material 3. This wire member 6 is placed in contact with the metal material. Though the wire member 6 is not directly involved in the bonding, a particular component of this wire member is caused to be dissolved into the metal material 3, so that it can improve the bonding strength between the metal material 3 and the glass sheets 1A, 1B.

(Fourth Embodiment)

Figure 7:
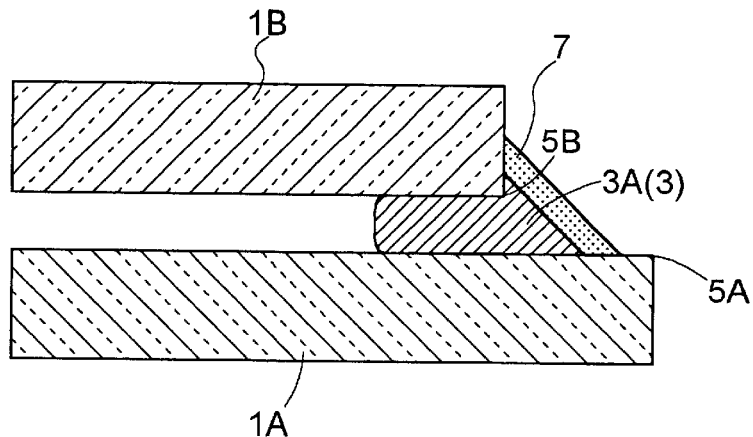
FIGS. 7 and 8 are partial section views showing a sealing portion relating to a fourth embodiment.
Figure 8:
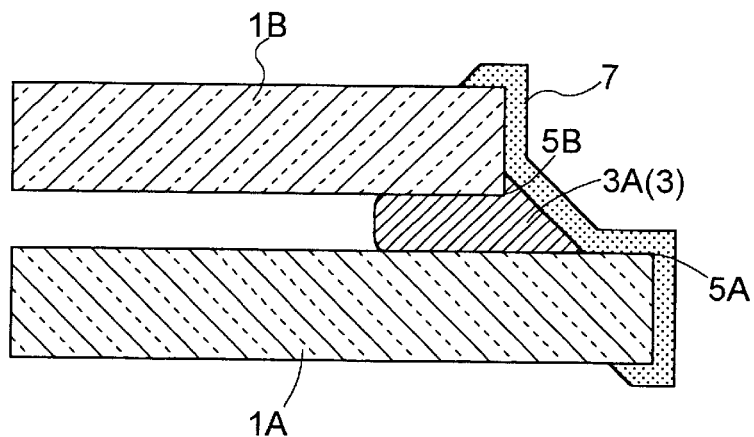

FIG. 7 shows an embodiment in which the outer surface of the metal material 3 is coated with a protecting coating film 7. This protecting coating film 7 is provided for reducing the influence from the environment such as water on the metal material 3. An embodiment shown in FIG. 8 is similar to that of FIG. 7. In this case, however, the protecting coating film 7 is provided to coat the entire section of the peripheral edge, so as to provide the protection of the sealed portion from the surrounding and also improvement of the strength.

In both of the embodiments of FIGS. 7 and 8, the protecting coating film 7 may be formed of any material such as organic material such as a resin, or an inorganic material such as ceramics or metal material 3 as long as it can fulfill the above-noted object. The air-tight sealing function per se is provided by the metal material 3. But, the protecting coating film 7 plays an indirect role in effectively maintaining the air-tight sealing performance as a protective layer or reinforcing layer for enhancing strength. Thus, such construction too is not contradictory to the concept of the present invention.

(Fifth Embodiment)

Figure 9:
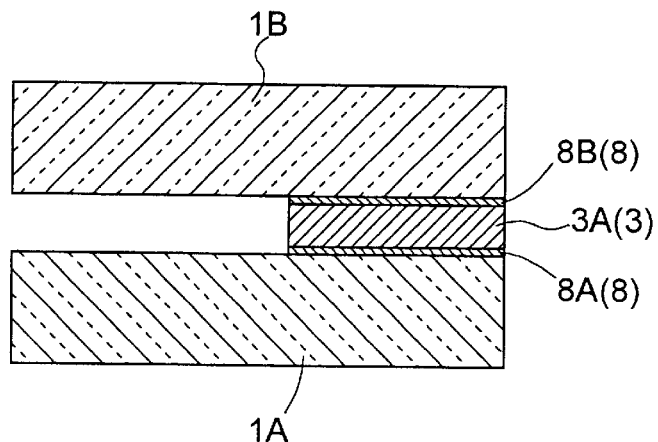
FIGS. 9 and 10 are partial section views showing a sealing portion relating to a fifth embodiment which is out of the scope of the present invention.
Figure 10:
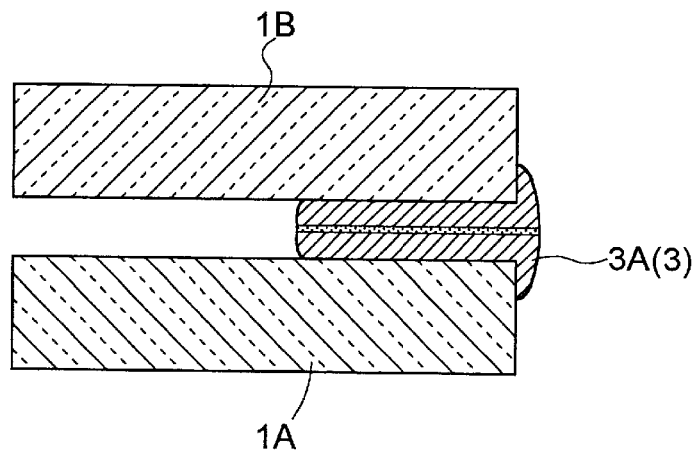

FIGS. 9 and 10 are partial sections showing constructions out of the scope of the claims of the present invention. That is, as shown in FIG. 9, metal coating films 8 are formed in advance on the opposing face of the two glass sheets 1A, 1B at the bonding portion so as to improve the wettability to the metal material 3. The metal material 3 is bonded to these metal coating films 8, not forming direct bonding with the surfaces of the glass sheets 1A, 1B. Further, in FIG. 10, layers of metal material 3 are formed in advance on the opposing faces of the glass sheets 1A, 1B at the portions thereof to be bonded and then these glass sheets are placed in opposition to each other and heated and fused to be attached to each other. In this case, there exist interface oxides 9 at the overlapping portions of the layer surfaces.

These constructions shown in FIGS. 9 and 10 are not suitable for maintaining the high degree of air-tightness at the peripheral edge of the glass panel P. That is, although physical bonding is formed, the bonding between the metal material 3 and the glass sheets 1A, 1B is not dense, so that microscopic gaps which can act as passage for gas molecules tend to be formed.

(Sixth Embodiment)

Figure 11:
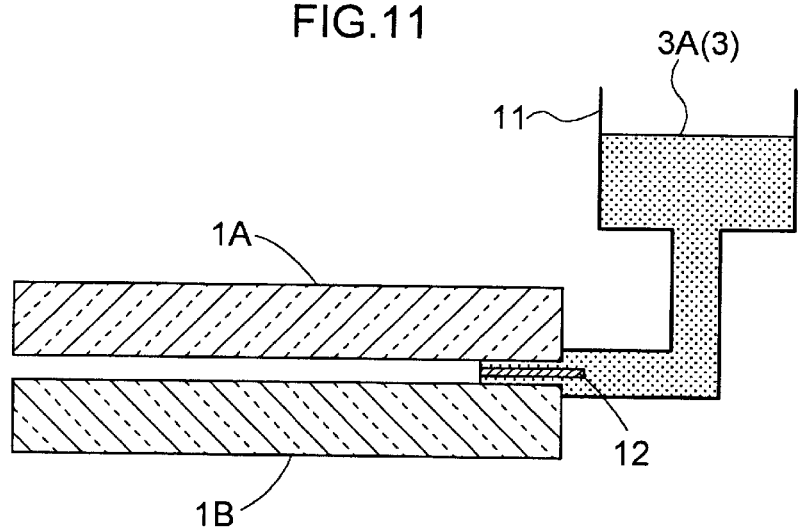
FIG. 11 is a section view showing an embodiment of a manufacturing method relating to a sixth embodiment.
Figure 12:
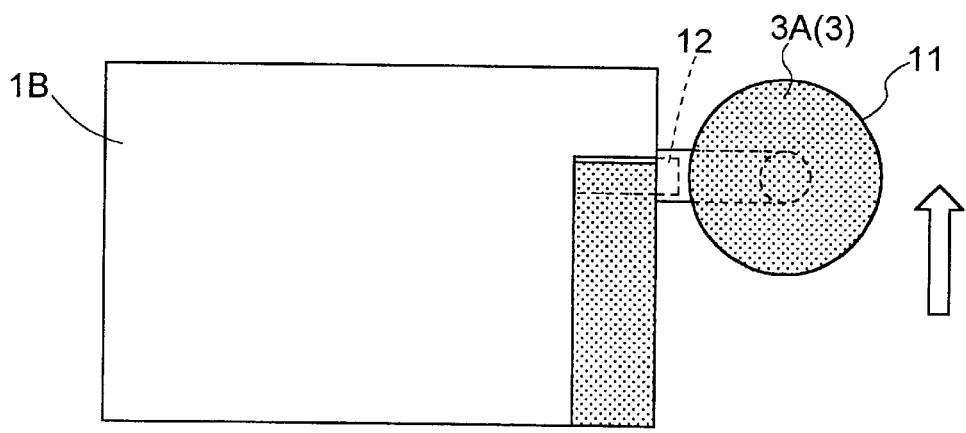
FIG. 12 is a plan view showing the embodiment of a manufacturing method relating to the sixth embodiment.

FIGS. 11 an 12 are schematic views illustrating a manufacturing method of a glass panel P suitable as a first method of the present invention. FIG. 11 is a side view in section and FIG. 12 is a plan view. The molten metal material 3 (solder 3A) is fed via a guide 12 from a solder melting basin 11 to be charged into the periphery of the gap between the glass sheets 1A, 1B. The solder melting basin 11 and the guide 12 are provided as an integrated assembly, so that as this assembly is moved along the edges 1A, 1B of the glass sheets 1A, 1B while charging the solder 3A, the entire peripheral edge of the glass sheets is sealed. In this case, the guide 12 was moved at a rate of 50 mm/s.

(Seventh Embodiment)

Figure 13:
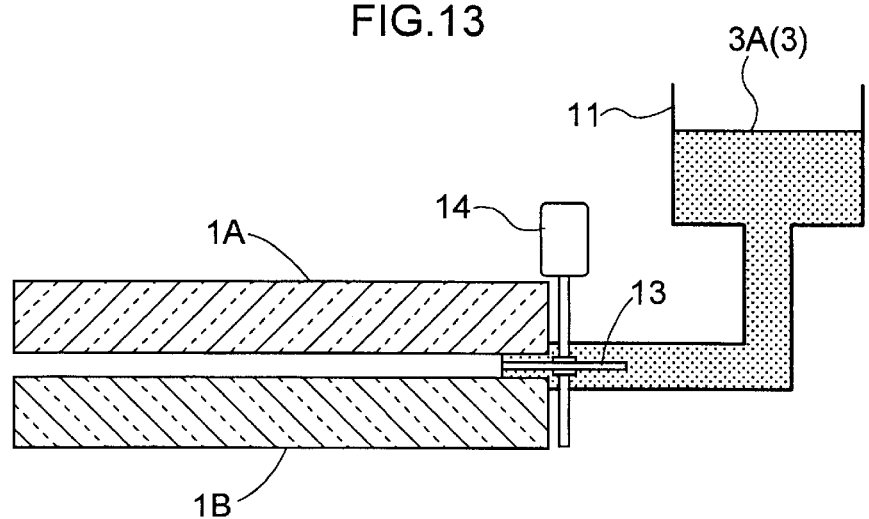
FIG. 13 is a section view showing an embodiment of a manufacturing method relating to a seventh embodiment.
Figure 14:
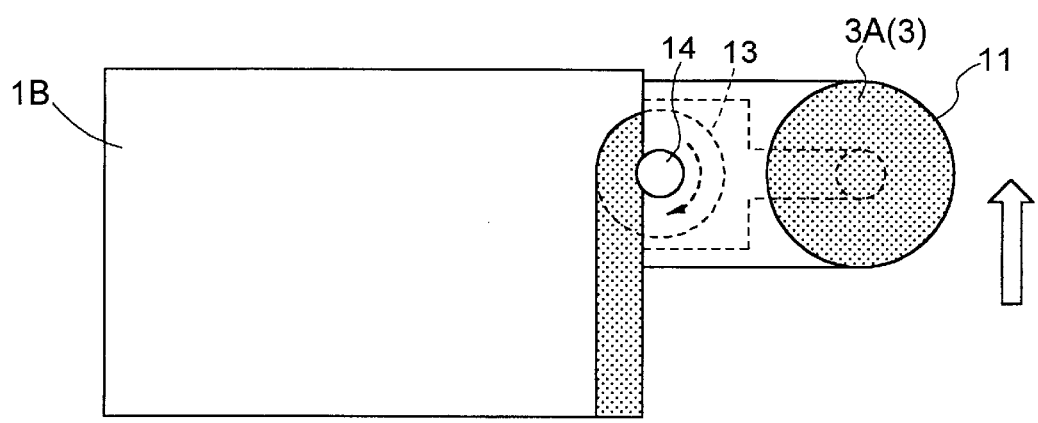
FIG. 14 is a plan view showing the embodiment of a manufacturing method relating to the seventh embodiment.

FIGS. 13 and 14 are views schematically illustrating a further embodiment of a manufacturing method of the glass panel P suitable as the first method of the present invention. FIG. 13 is a side view in section and FIG. 14 is a plan view. In this case, a rotary disc 13 is inserted into the gap. This rotary disc 13 is driven to rotate by means of a driving motor 14 and is movable along the peripheral edge of the glass panel. This rotary disc 13 helps the molten solder 3A to be dispensed from the solder melting basin 11, so that the solder 3A is charged to the peripheral edge of the gap between the glass sheets 1A, 1B. And, this disc provides the function of physically renewing the interfaces between the solder 3A and the glass sheets 1A, 1B. As this is moved along the edges of the glass sheets 1A, 1B while charging the solder 3A, the entire peripheral edges of the glass sheets are sealed. In this case, the rotary disc 13 was rotated at 2000 rpm clockwise as seen in the plan view of FIG. 14. The moving direction of the rotary disc 13 in this case was in the direction of arrow shown in FIG. 14.

(Eighth Embodiment)

Figure 15:
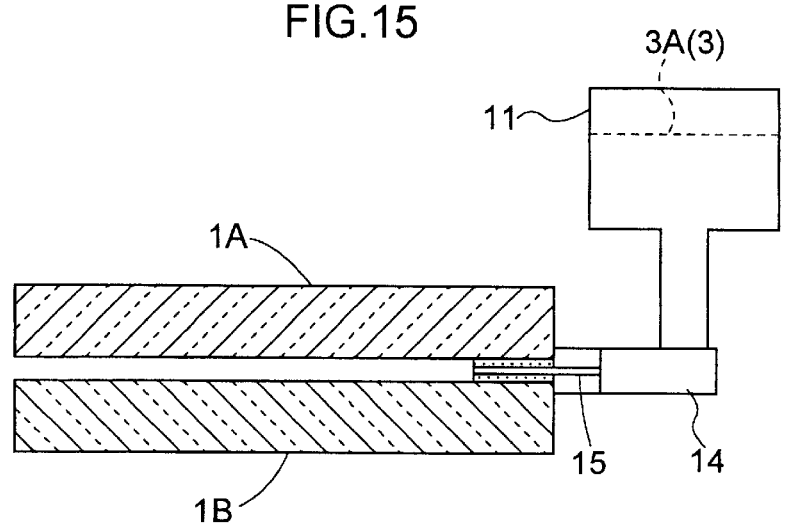
FIG. 15 is a section view showing an embodiment of a manufacturing method relating to an eighth embodiment.
Figure 16:
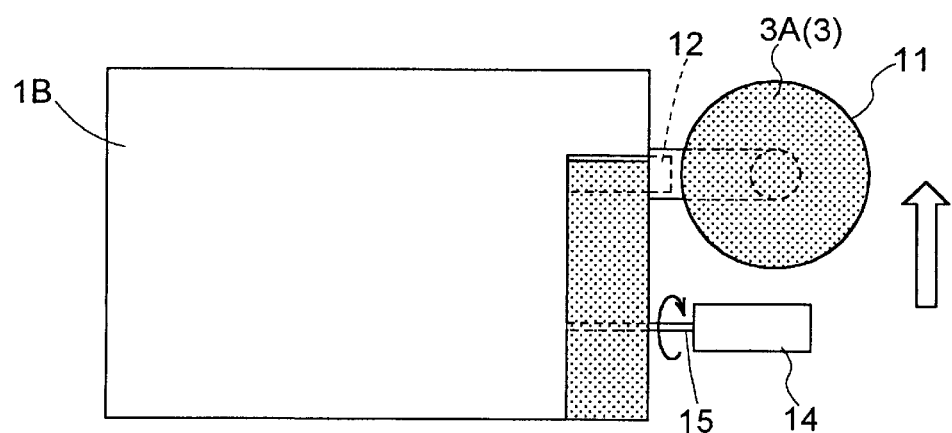
FIG. 16 is a plan view showing the embodiment of a manufacturing method relating to the eighth embodiment.

FIGS. 15 and 16 are schematic illustration of an embodiment relating to the first method of the present invention. FIG. 15 is a side view in section and FIG. 16 is a plan view. Like the method shown in FIG. 11, the molten solder 3A from the melting basin 11 is charged via the guide 12 into the peripheral edge of the gap between the glass sheets 1A, 1B. Further, in this embodiment, a rotary bar 15 is provided for physically renewing the interfaces between the solder 3A and the glass sheets 1A, 1B, so as to forcibly stir the charged solder 3A. This rotary bar 15 is rotatably driven by means of a driving motor 14. In FIG. 16, the guide 12 and the rotary bar 15 advance in the direction of arrow. In this case, the rotary bar 15 was rotated clockwise as seen in a direction from which the glass panel P is seen from the side of the driving motor 14. The rotational speed was set at 15000 rpm. The solder melting basin 11 and the rotary bar 15 are moved together. Then, as they are moved along the edges of the glass sheets 1A, 1B to charge the solder 3A, the entire peripheral edge of the glass sheets is sealed.

(Ninth Embodiment)

Figure 17:
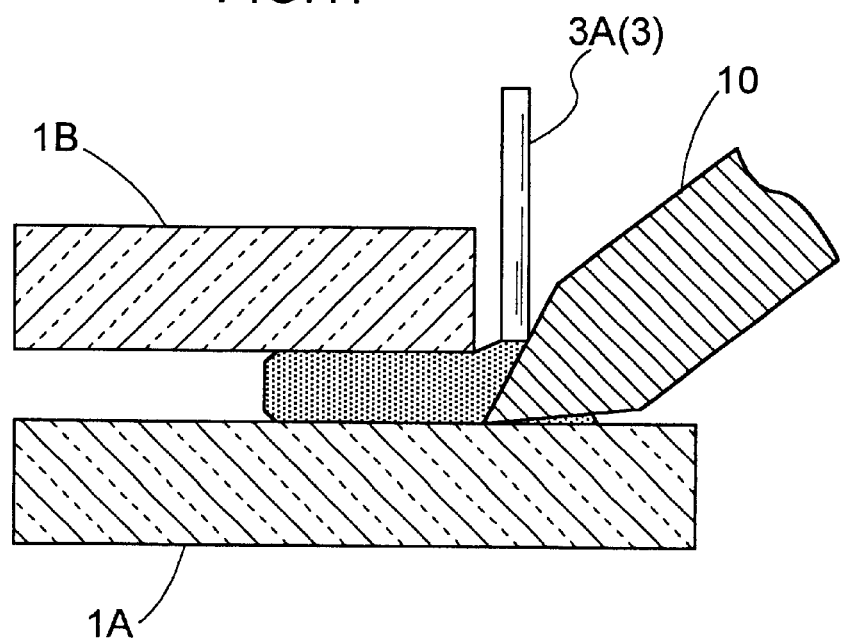
FIG. 17 is a partial section view showing a sealing method relating to a ninth embodiment.

FIG. 17 illustrates a method of charging the metal material 3 into the gap of the peripheral edges of the glass sheets 1A, 1B by causing the material 3 to permeate into the gap by a capillary phenomenon. In doing so, the pair of glass sheets 1A, 1B are heated and maintained at a temperature below a liquidus temperature of the metal material 3. At the same time, vibration is applied to at least one of the molten metal material 3 and the glass sheets 1A, 1B.

The heating of the glass sheets 1A, 1B is effected by placing and heating them on a graphite plate of a hot plate device. And, as the metal material 3 is molten by using e.g. a ultrasonic soldering iron having a soldering end thereof vibrated at a predetermined frequency, the material is caused to permeate into the gap V between the glass sheets 1A, 1B. FIG. 17 illustrates a process for sequentially feeding the wire member of the solder 3A as the metal material 3. After the solder 3A has been permeated, it is cooled to the room temperature so as to seal the outer periphery of the glass sheets 1A, 1B.

(Tenth Embodiment)

Figure 18:
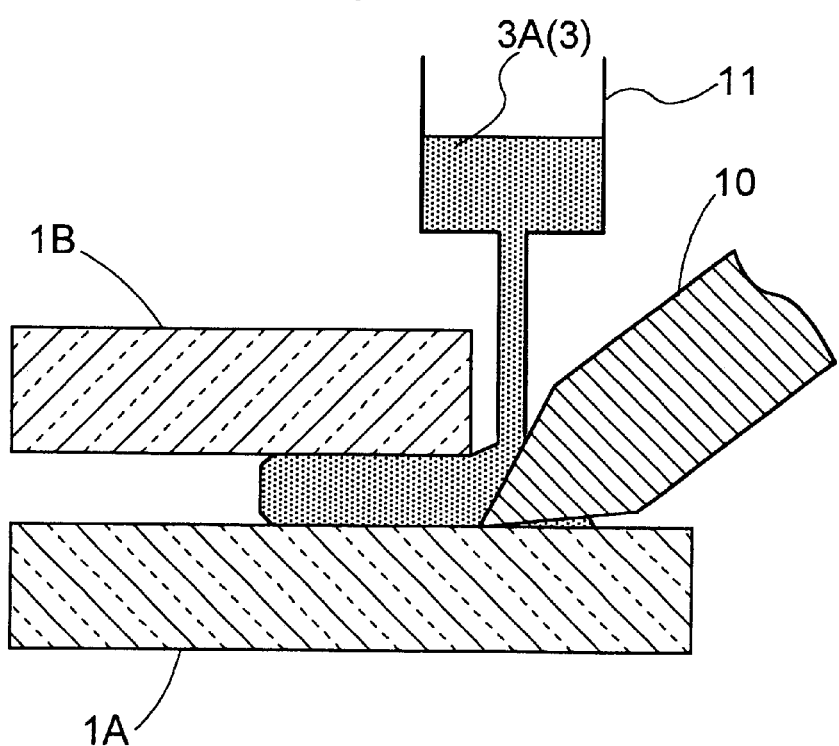
FIG. 18 is a partial section view showing a sealing method relating to a tenth embodiment.

FIG. 18 too shows a method of charging the metal material 3 into the gap at the peripheral edges of the glass sheets 1A, 1B by means of permeation thereof utilizing the capillary phenomenon. In this case too, the glass sheets 1A, 1B are heated and maintained at a temperature below the liquidus temperature of the metal material 3 and vibration is applied to at least one of the metal material 3 and the glass sheets 1A, 1B.

In this case, however, the solder 3A as the metal material 3 is molten in advance and reserved in the solder melting basin 11. Then, an appropriate amount of the solder 3A is withdrawn and fed from the bottom of the solder melting basin 11. And, in this embodiment too, while the solder 3A is maintained at this molten state by using e.g. a supersonic soldering iron 10, the solder is caused to permeate into the gap V between the glass sheets 1A, 1B.

(Other Embodiments)

Incidentally, the composition of the glass sheets 1A, 1B employed in the respective embodiments described above or any other embodiment is not particularly limited. Any component such as of soda lime silica glass used in a standard window pane, borosilicate glass, aluminosilicate glass, crystallized glass, etc. may be employed. Further, the manufacturing method of the glass sheets 1A, 1B is not particularly limited, as it can be any of float process, roll-out process, down-draw process, press process, etc. Further, it is also possible to employ air-cooled tempered glass sheets 1A, 1B. Moreover, on the surfaces of the glass sheets 1A, 1B, oxide coating films, metal coating films may be formed for the purpose of improvement in the optical and/or thermal properties. Unlike the metal coating films for solder fusion formed by molten metal spraying or plating, these films, if formed as dense films by such process as thermal decomposition method, chemical vapor deposition method, sputtering process, etc, can be firmly bonded to the surfaces of the glass sheets 1A, 1B to be integrated therewith. Therefore, the use of the glass sheets 1A, 1B having such coating films formed thereon is not contradictory to the essential concept of the present invention, that is, the direct bonding between the glass sheets 1A, 1B and the metal material 3.

Further, it is also not contradictory to the essential concept of the present invention to employ a film which is physically or chemically so weak as not to interfere with the hermetic sealing between the glass sheets 1A, 1B and the metal material 3. For instance, it can be a coating film which is dissolved into the metal material 3 in the course of the direct bonding between the glass sheets 1A, 1B and the metal material 3 and which will hardly remain thereafter at the interfaces between the glass sheets 1A, 1B and the metal material 3.

Also, the use of the glass sheets 1A, 1B in the present invention are not limited the use of the one glass sheet 1A and the other glass sheet 1B having a same width or same dimensions. It is also possible to employ glass sheets having different dimensions. And, the superposing manner of the two glass sheets 1A, 1B is not limited to superposing them with their edges in alignment with each other. Instead, the edge 5A of one glass sheet 1A may project beyond the edge 5B of the other glass sheet 1B. Further, the glass panel P may be assembled from one glass sheet 1A and the other glass sheet 1B having different thickness from each other.

The glass panel P having hermetic sealed peripheral edge may be sealed with its gap V depressurized by a known art, e.g. by the method disclosed in the Japanese national publication gazette No. Hei. 5-501896. Or, an opening provided for evacuation depressurization may be sealed by a method similar to the present invention. In either case, the present invention relates to the art of hermetic sealing of the peripheral edge of the glass panel P, the invention does not provide any limit in the method of sealing the gap V under a depressurized condition.

Next, some examples will be described.

EXAMPLE 1

<Shape of Glass Panel>

A float glass sheet having thickness of 3 mm was cut into a square sheet of 300 mm×300 mm and a square sheet of 290 mm×290 mm, respectively. In the 290 mm square glass sheet, a through hole having a diameter of 2.0 mm was formed at the center thereof. Then, these two glass sheets were washed and dried.

Thereafter, the 300 mm square glass sheet was placed and on the upper side thereof, a plurality of pillars having a height of 0.05 mm and a diameter of 0.5 mm were arranged with a spacing of 20 mm from each other; and the 290 mm square glass sheet with the through hole defined therein was superposed thereon with the centers of the two glass sheets being aligned with each other. The strain point of these glass sheets was 500° C.

<Metal Material>

As the metal material, there was employed solder which was a lead-free single metal material having the composition of Sn 90.5%, Zn 9.0%, Ti 0.15%, Cu 0.35%.

<Charging Operation of the Metal Material>

The two glass sheets were set on a graphite plate of a hot plate device and heated to 150° C. On the other hand, the solder was molten by means of a ultrasonic soldering iron having its soldering end vibrated at the frequency of 60 kHz.

By causing the molten solder to permeate into the gap between the two glass sheets, the bonding portion was formed over the entire surface at the peripheral edges of the opposing faces of the glass sheets. The feeding operation of the solder to the bonding portion was carried out by sequentially feeding a wire material of the solder of the above-described composition. Incidentally, this solder had a liquidus temperature of 215° C. Thereafter, by cooling to the room temperature, the outer peripheral edge of the gap was sealed hermetically by means of the solder. With this there was obtained a glass panel in which the solder was permeated to fill the gap between the two glass sheets and the sealing width at the gap of the glass sheets from the peripheral edge ranged from 2.5 mm to 4 mm and the solder covered the entire periphery of the side faces of the 290 mm square glass sheet. All of these operations were carried out in the atmosphere. Further, the solder was permeated such that as shown in FIG. 17, the surface of the molten solder was covered with a thin oxide layer while the inner portion of the solder permeating into the gap of the glass sheets did not contain oxides. The cross section of this bonded portion was observed to find that it was like the one shown in FIG. 5 over the entire periphery.

<Leak Test>

On this glass panel, air was forcibly evacuated from the gap through the through hole of 2.0 mm diameter to test leakage therefrom by means of a helium leak detector. It was observed that the leak was less than $1 \times 10^{-11}$ (Pa.m$^3$/s) demonstrating the extremely high airtightness at the peripheral edge of this glass panel.

<Determination of Thermal Conductance>

Separately from the above, on this glass panel, the evacuation through hole was sealed by means of evacuation in the same manner as the peripheral edge. At the time of sealing, the pressure inside the glass panel was determined as being lower than $1 \times 10^{-3}$ (Pa). Then, the thermal conductance of this glass panel was determined as 2.5 (W/m$^2$.K) (2.2 (kcal/m$^2$h° C.), demonstrating the glass panel having an extremely high heat insulating performance.

<Test of Elution of Lead>

Also, a test of lead elution was conducted in the manner described next. The sample glass panel was dipped into 2000 ml of pure water having a temperature of 80° C. and maintained therein for 24 hours. Then, the lead content of the liquid was determined by means of ICP spectrometry. From this content, it was tried to obtain an elution amount of lead per unit area at the portion of the bonded portion where the solder was exposed. As a result, the lead concentration in the liquid was below the detection limit, showing that no lead was eluted.

<Determination of Oxygen Content>

The solder was sampled from the bonded portion for analysis. It was shown that the solder contained 0.0015% of O (oxygen).

Further, as the method of feeding the solder for bonding, the method of FIG. 18 was employed, so that a solder meting basin was provided for melting the solder in advance and reserving it therein and an appropriate amount of the solder was fed from the bottom face of the basin. With the other conditions than this method being the same as above, a glass panel was obtained. This glass panel was evaluated in the same manner as above and the same results were obtained.

Further, except for the height of the pillars changed to 0.2 mm, with the other conditions being the same, a further glass panel was obtained and the results of evaluation of this were also the same.

TABLE 1

| Component | example 1 | example 2 | example 3 | example 4 | Example 5 |
|---|---|---|---|---|---|
| Sn | 90.5 | 99.85 | 99.5 | 90.5 | 98.5 |
| Zn | 9 | 0 | 0 | 9 | 0.5 |
| Al | 0 | 0 | 0 | 0 | 0.5 |
| Si | 0 | 0 | 0 | 0 | 0.5 |
| Ti | 0.15 | 0.15 | 0.15 | 0.15 | 0.005 |
| Cu | 0.35 | 0 | 0.35 | 0 | 0 |
| Total | 100 | 100 | 100 | 100 | 100 |
| TL (° C.) | 215 | 250 | — | — | — |

TABLE 2

| Component | example 6 | example 7 | example 8 | example 9 | Example 10 |
|---|---|---|---|---|---|
| Sn | 98.5 | 0 | 90.8 | 99.65 | 98.5 |
| Zn | 0 | 95 | 9 | 0 | 0.5 |
| Al | 2 | 5 | 0.1 | 0.1 | 0.5 |
| Si | 0 | 0 | 0.1 | 0.2 | 0.5 |
| Ti | 0 | 0 | 0.002 | 0.05 | 0.006 |
| Cu | 0 | 0 | 0 | 0 | 0.01 |
| Total | 100 | 100 | 100 | 100 | 100 |
| TL (° C.) | 380 | 382 | 205 | 230 | 215 |

EXAMPLES 2–10

By using solder having the compositions shown in Tables 1 and 2 above, and with the other conditions being the same as those in example 1, glass panels were produced.

For all of the examples 2–10 shown in Tables 1 and 2, the same leak tests, determination of thermal conductance, the lead elution tests and the determination of oxygen contents as example 1 were carried out. Then, substantially same results as the example 1 were obtained.

EXAMPLE 11

The glass panel used in this example had the same shape as that used in example 1. In this case, however, a metal wire containing Ti and having a diameter of 0.05 mm was disposed at the gap between the bonded portions of the glass sheets.

The two glass sheets were set on a graphite plate of a hot plate device and heated to 150° C. On the other hand, the solder as the single metal material having the composition of Sn 91% and Zn 9.0% was molten by means of a ultrasonic soldering iron having its soldering end vibrated at the frequency of 60 kHz. By causing the molten solder to permeate into the gap between the two glass sheets, the bonding portion was formed over the entire surface at the peripheral edges of the opposing faces of the glass sheets. In the course of this, the Ti-containing metal wire was placed in contact with the molten solder. The feeding operation of the solder to the bonding portion was carried out by sequentially feeding a wire material of the solder of the above-described composition. Incidentally, this solder had a liquidus temperature of 198° C. Thereafter, by cooling to the room temperature, the outer peripheral edge of the gap was sealed hermetically by means of the solder. With this there was obtained glass panel in which the solder was permeated to fill the gap between the two glass sheets and the sealing width at the gap of the glass sheets from the peripheral edge ranged from 2.5 mm to 4 mm and the solder covered the entire periphery of the side faces of the 290 mm square glass sheet. All of these operations were carried out in the atmosphere. When the condition of the section of this bonded portion was observed, it was same as shown in FIG. 5 over the entire periphery.

On this glass panel, the same leak test, determination of thermal conductance, and the lead elution test were carried out as example 1. Then, substantially same results as the example 1 were obtained.

Further, like the example 1, on the section at the bonded portion between the solder and the respective glass sheets, a line analysis and a mapping analysis were carried out by EPMA to check the distribution of the respective components of the solder. As a result, it was seen that the solder contained Ti which had been dissolved from the Ti-containing metal wire and contained also oxygen.

EXAMPLE 12

In this example, when the molten solder was caused to permeate into the gap between the glass sheets by the capillary phenomenon, two kinds of vibrations of 40 kHz and 700 Hz were applied simultaneously. Specifically, the 40 kHz vibration was applied to the soldering end of the ultrasonic soldering iron and the 700 Hz low-frequency vibration was applied to the entire ultrasonic soldering iron by means of another vibrating member. The other conditions were same as in example 1. In this case, the sealing width of the gap from the edge was from 3.0 mm to 3.6 mm. The uniformity of the sealing width was good. The evaluations of the glass panel produced were carried out in the same manners as the example 1 and all the results were also same as the example 1.

EXAMPLE 13

In this example too, when the molten solder was caused to permeate into the gap between the glass sheets by the capillary phenomenon, two kinds of vibrations of 40 kHz and 700 Hz were applied simultaneously. In this example, however, the 40 kHz vibration was applied to the soldering end of the ultrasonic soldering iron and the 700 Hz low-frequency vibration was applied to the peripheral edge of the upper glass sheet by means of another vibrating member. The other conditions were the same as the example 1. In this case, the sealing width of the gap from the edge was from 3.0 mm to 3.6 mm. The uniformity of the sealing width was good. The evaluations of the glass panel produced were carried out in the same manners as the example 1 and all the results were also same as the example 1.

EXAMPLE 14

<Shape of Glass Panel>

The shape of the glass panel in this example was as follows. A float glass sheet having thickness of 3 mm was cut into two square sheets of 300 mm×300 mm. In one glass sheet, a through hole having a diameter of 2.0 mm was formed at the center thereof. Then, these two glass sheets were washed and dried.

Thereafter, one glass sheet was placed and on the upper side thereof, a plurality of pillars having a height of 0.2 mm and a diameter of 0.5 mm were arranged with a spacing of 20 mm from each other; and the other glass sheet with the through hole defined therein was superposed thereon with the peripheral edges of the two glass sheets being aligned with each other. The strain point of these glass sheets was 500° C.

<Metal Material>

As the bonding material, there was employed solder which was a substantially lead-free single metal material having the composition of Sn 90.85%, Zn 9.0% and Ti 0.15%. The liquidus temperature of this solder was 215° C.

<Heating Condition of the Glass Sheets>

Prior to the charging of the solder, the two glass sheets were set on a graphite plate of a hot plate device and were heated to 180° C.

<Charging Operation of the Metal Material>

The permeation of the metal material was carried out in the following manner. By the method schematically illustrated in FIG. 11, the peripheral edges of the two glass sheets were sealed. That is, into the gap between the heated glass sheets, the solder molten in the solder melting basin was fed by the pipe having the guide, so that the solder was charged into the gap between the glass sheets for bonding them together. The guide was a metal plate having a thickness of 0.15 mm, a portion of which was inserted from the leading end, i.e. the outlet, of the pipe slightly into the inside of the pipe and the gap. The pipe had an inner diameter of 3 mm and the inserting depth of the guide into the gap was about 5 mm. While feeding the solder, this solder feeding device was moved along the peripheral edges, whereby the solder-charged portion was formed over the entire peripheral edge of the gap. Thereafter, the assembly was cooled to the room temperature, so as to hermetically seal the outer peripheral edges of the gap with the solder. The solder was charged at the gap between the opposed glass sheets and the sealing width at this gap from the edge was about 5 mm. Incidentally, all these operations were carried out in the atmosphere. The solder fed was the portion of the solder which had not been exposed to the atmosphere within the solder melting basin and which therefore did not contain oxides.

On this glass panel, the same leak test, determination of thermal conductance, the lead elution test and the determination of oxygen content were carried out as example 1. Then, substantially same results as the example 1 were obtained.

EXAMPLE 15

In this example, the shape of the glass panel, the metal material and the heating condition of the glass panel were all the same as those employed in example 14.

By the method schematically illustrated in FIG. 13, the peripheral edges of the two glass sheets were sealed. That is, into the gap between the heated glass sheets, the solder molten in the solder melting basin was fed by using a rotary disc acting as a guide and acting also as a stimulus conducting member to be charged into the gap, thereby bonding the glass sheets together. The rotary disc was a metal disc having a thickness of 0.1 mm and a diameter of 20 mm. The rotary disc was provided at the outlet of the solder feeding device such that the disc was entirely submerged in the solder to be fed. This rotary disc has a function of introducing the solder into the gap and a further function of physically renewing the interface between the solder and the glass sheets.

In feeding the solder to the gap, the portion of the solder exposed to the atmosphere is not to be fed. This is because such solder portion exposed to the atmosphere contains oxides. The rotary disc has a portion thereof inserted into the gap and the inserting depth from the edge of the glass sheet was about 3 mm. The rotation direction was clockwise as seen in a plan view of the glass panel as shown in FIG. 14 and its moving direction was the direction denoted with an arrow in FIG. 14. The rotational speed of the rotary disc was 2000 rpm.

By this method, while feeding the solder, this solder feeding device was moved along the peripheral edge to form a solder-charged portion over the entire surface at the peripheral edges of the opposing faces of the glass sheets. Thereafter, the assembly was cooled back to the room temperature to hermetically seal the outer periphery of the gap with the solder. The solder remained charged at the gap between the two glass sheets and the sealing width at this gap from the edge was about 3 mm. Incidentally, all these operations were carried out in the atmosphere.

On this glass panel, the same leak test, determination of thermal conductance, the lead elution test and the determination of oxygen content were carried out as example 1. Then, substantially same results as the example 1 were obtained.

EXAMPLE 16

In this example, the shape of the glass panel, the metal material and the heating condition of the glass panel were all the same as those employed in example 14 and example 15.

By the method schematically illustrated in FIG. 15, the peripheral edges of the two glass sheets were sealed. That is, into the gap between the heated glass sheets, the solder molten in the solder melting basin was fed by using a pipe having a guide to be charged into the gap. In doing this, the interface between the solder charged into the gap between the two glass sheets and the glass was being physically renewed by means of a rotary bar acting as a stimulus conducting member, the two glass sheets were bonded together. As the rotary bar, there was employed a metal bar having a diameter of 0.15 mm. The solder melting basin and the guide and their functions are as same as those described in example 14. Although the solder was forcibly stirred by means of the rotary bar, the rotary bar was adapted to immediately follow the guide so as to prevent the portion of the solder exposed to the atmosphere and containing oxides from entering the gap. The rotary bar had a portion thereof inserted into the gap and the inserting depth from the edge of the glass sheet was about 5 mm. By this method, while feeding the solder, this solder feeding device was moved along the peripheral edge to form a solder-charged portion over the entire surface at the peripheral edges of the opposing faces of the glass sheets. Thereafter, the assembly was cooled back to the room temperature to air-tightly seal the outer periphery of the gap with the solder. The solder remained charged at the gap between the two glass sheets and the sealing width at this gap from the edge was about 5 mm. All these operations were carried out in the atmosphere. The solder fed was the solder portion which had not been exposed to the atmosphere inside the solder melting basin and therefore did not contain oxides.

On this glass panel, the same leak test, determination of thermal transmission coefficient, the lead elution test and the determination of oxygen content were carried out as example 1. Then, substantially same results as the example 1 were obtained.

Comparative Example 1

Solder having the composition of Pb 91.0%, Sn 5.0%, Zn 3.0%, Sb 1.0% was employed. With the other conditions being the same as example 1, a glass panel was manufactured. In this case, however, the pre-heating temperature of the glass sheets was set at 200° C.

Leak was tested by means of a helium leak detector. It was observed that the leak was less than $1 \times 10^{-11}$ (Pa.m$^3$/s) demonstrating the extremely high airtightness at the peripheral edge of this glass panel. However, when a lead elution test was conducted in the same manner as example 1, it was observed that the elution amount of lead per unit area at the portion of the bonded portion where the solder was exposed was 0.4 mg/cm$^2$, showing significant elution of lead.

Comparative Example 2

A float glass sheet having thickness of 3 mm was cut into two square sheets of 300 mm×300 mm. In one glass sheet, a through hole having a diameter of 2.0 mm was formed at the center thereof. Then, these two glass sheets were washed and dried.

Then, on each of these two glass sheets, along the entire peripheral edge of its one side, an electroless nickel plating was applied in the thickness of 0.2 μm by a standard method by a width of 10 mm from the edge of the respective glass sheet. Next, on the nickel plating of one glass sheet, a foil of solder having the composition of Pb 91.0%, Sn 5.0%, Zn 3.0% and Sb 1.0% was placed in the width of 10 mm and the thickness of 0.1 mm. Further, on the face of this glass sheet, a plurality of pillars having the height of 0.05 mm and the diameter of 0.5 mm were arranged with a spacing of 20 mm from each other.

Thereafter, the other glass sheet having the through hole defined therein was superposed on the one glass sheet, with the centers thereof being aligned with each other and also with the faces thereof with the nickel plating being in opposition to each other.

These two glass sheets were then set on a graphite plate and charged into an electric furnace which was maintained at 350° C. and kept therein for 15-minutes for melting the solder foils so as to bond the entire peripheral edges of the opposing faces of the glass sheets. Thereafter, by cooling the assembly back to the room temperature, there was obtained a glass panel having the outer periphery of the gap sealed with the nickel plating and the solder foils.

On this glass panel, air was forcibly evacuated from the gap through the through hole of 2.0 mm diameter to test leakage therefrom by means of a helium leak detector. It was observed that the leak amount was more than $1 \times 10^{-3}$ (Pa.m$^3$/s) demonstrating insufficient airtightness at the peripheral edge of this glass panel. Further, when a lead elution test was conducted in the same manner as example 1, it was observed that the elution amount of lead per unit area at the portion of the bonded portion where the solder was exposed was 0.4 mg/cm$^2$, showing significant elution of lead.

Comparative Example 3

A float glass sheet having thickness of 3 mm was cut into two square sheets of 300 mm×300 mm. In one glass sheet, a through hole having a diameter of 2.0 mm was formed at the center thereof. Then, these two glass sheets were washed and dried.

Then, on each of these two glass sheets, along the entire peripheral edge of its one side, paste of solder having the composition of Pb 91.0%, Sn 5.0%, Zn 3.0% and Sb 1.0% was applied in the width of 10 mm as measured from the edge of the glass sheet. Then, by sintering at 350° C., a solder layer having the thickness of 0.15 mm was formed on the glass sheet. Further, on the face of this glass sheet, a plurality of pillars having the height of 0.2 mm and the diameter of 0.5 mm were arranged with a spacing of 20 mm from each other.

The other glass sheet having the through hole defined therein was set over the one glass sheet with the centers of the glass sheets being aligned with each other and the glass sheet faces thereof having the solder layers being opposed to each other and these glass sheets were placed one on the other.

These two glass sheets were then set on a graphite plate and charged into an electric furnace which was maintained at 350° C. and kept therein for 15 minutes for melting the solder layers so as to bond the entire peripheral edges of the opposing faces of the glass sheets. Thereafter, by cooling the assembly back to the room temperature, there was obtained a glass panel having the outer periphery of the gap sealed with the welded solder layer.

On this glass panel, the leak test and lead elution test were conducted. Then, substantially same results as comparison example 2 were obtained.

TABLE 3

| component | Example 11 | Comparative examples 1–3 | Comparative example 4 | Comparative example 5 | Comparative example 6 |
|---|---|---|---|---|---|
| Sn | 91.0 | 5 | 11 | 20 | 48 |
| Zn | 9 | 3 | 3 | 3 | 3 |
| Pb | 0 | 91 | 85 | 76 | 48 |
| Sb | 0 | 1 | 11 | 1 | 1 |
| total | 100 | 100 | 100 | 100 | 100 |
| TL (° C.) | 380 | 297 | 286 | 266 | 210 |

Comparison Examples 4–6

By using the solder having compositions shown in Table 3 above, glass panels were manufactured in the same manner as example 1. In these cases, however, the preheating temperature of the glass sheets was 200° C. in the case of the comparative example 4 and the comparative example 5 and 150° C. in the case of the comparative example 6. These solder compositions are out of the claimed scope of the present invention.

On these manufactured glass panels, the leak tests were conducted. Then, substantially same results as the comparative example 2 were obtained. Observation of the portions of the glass sheets where the leak was particularly conspicuous revealed partial detachment of the solder.

The lead elution test conducted like example 1 revealed substantially same results as comparative example 2.

INDUSTRIAL APPLICABILITY

The glass panel and its manufacturing method of the present invention find their applications in the field of building construction, vehicles (window shield of automobile, railway train or of a boat), various instruments (display panel of a plasma display device, a door or wall of a refrigerator or heat-insulating device), etc.

The composition of the glass sheets to be employed in the present invention is not particularly limited. Any composition used in the standard window pane such as soda lime silica glass, borosilicate glass, aluminosilicate glass, crystallized glass, etc. can be used.

What is claimed is:

1. A glass panel including a pair of glass sheets disposed in opposition to each other with forming a gap therebetween, peripheral edges of the glass sheets being bonded directly by a single-alloy metal material for sealing the gap hermetically, wherein that the panel satisfies the following relationship:

$$100 \leq T_L \leq (T_S\ 100)$$

where $T_L$ is the liquidus temperature of the metal material in degrees Celsius and $T_S$ is the strain point of the glass sheets in degrees Celsius.

2. The glass panel according to claim 1, wherein the metal material contains not more than 0.1 wt. % or substantially zero wt. % of lead.

3. The glass panel according to claim 1, wherein the metal material contains at least two components selected from the group consisting of Sn, Zn, Al, Si and Ti.

4. The glass panel according to claim 1, wherein the metal material contains oxygen in the range from 0.0001 to 1.5 wt. %.

5. The glass panel according to claim 1, wherein the pair of glass sheets have different dimensions so that one glass sheet is disposed in opposition to the other glass sheet with the one sheet projecting at a peripheral edge thereof by a width of 1 to 10 mm from each peripheral edge of the other sheet with the metal material being charged from the projecting portion of the one glass sheet into the gap between the glass sheets.

6. The glass panel according to claim 1, wherein the gap is sealed so as to keep a depressurized condition.

7. A method of manufacturing a glass panel comprising the steps of:

disposing spacers between a pair of glass sheets so as to form a gap therebetween;

charging a molten single-alloy metal material to the peripheral edges of the glass sheets the metal material satisfying the following relationship:

$$100 \leq T_L \leq (T_S - 100)$$

where $T_L$ is the liquidus temperature of the metal material in degrees Celsius and $T_S$ is the strain point of the glass sheets in degrees Celsius; and directly bonding the glass sheets and the metal material together so as to seal the gap hermetically.

8. The method of manufacturing a glass panel according to claim 7, further comprising the steps of heating and maintaining the pair of glass sheets at a temperature below the liquidus temperature of the metal material, the molten metal material having a portion coming into contact with an atmosphere and a further portion not coming into contact with the atmosphere before the metal material is charged into the gap between the glass sheets and charging into the gap at the peripheral edge of the glass sheets only the portion of the metal material which did not come into contact with the atmosphere, while preventing the portion which came into contact with the atmosphere from being charged into the gap.

9. The method of manufacturing a glass panel according to claim 7, wherein the step of charging the molten metal material into the gap between the glass sheets employs a guide for guiding the metal material to the gap, at least a portion of the guide being inserted into the gap.

10. The method of manufacturing a glass panel according to claim 9, wherein the guide is a plate-like or bar-like guide.

11. The manufacturing method of a glass panel according to claim 7, wherein the method employs a stimulus conducting member for providing a physical stimulus to the interface between the molten metal material and the glass sheet surface so as to promote the direct bonding therebetween, at least a portion of the stimulus conducting member being inserted into the gap.

12. The manufacturing method of a glass panel according to claim 11, wherein the stimulus conducting member is a plate-like or bar-like member.

13. The manufacturing method of a glass panel according to claim 11, wherein the physical stimulus for promoting the direct bonding is provided by mechanical movement of the stimulus conducting member.

14. The method of manufacturing a glass panel according to claim 11, wherein that unevenness is provided on a surface of the stimulus conducting member.

15. The manufacturing method of a glass panel according to claim 9, wherein the guide and/or the stimulus conducting member is moved along the gap.

16. The manufacturing method of a glass panel according to claim 13, wherein said mechanical movement of the stimulus conducting member is either at least one of rotation and vibration.

17. The manufacturing method of a glass panel according to claim 9, wherein that at least one of the guide and the stimulus conducting member is made of the metal material.

18. The manufacturing method of a glass panel according to claim 11, wherein the guide and the stimulus conducting member are provided as a single member having the functions of both of them.

19. The manufacturing method of a glass panel according to claim 9, wherein the pair of glass sheets have different dimensions from each other and one glass sheet is disposed in opposition to the other glass sheet with a peripheral edge of the former projecting from a peripheral edge of the latter by a width of 1 mm through 10 mm, and the metal material is charged from the projecting portion of the one glass sheet toward the gap by utilizing capillary phenomenon.

20. The manufacturing method of a glass panel according to claim 9, wherein the pair of glass sheets are heated and maintained at a temperature below the liquidus temperature of the metal material and under this condition, vibration is applied to at least one of the molten metal material or the glass sheets, so as to cause the metal material to permeate and to be charged into the gap by utilizing capillary phenomenon.

21. The manufacturing method of a glass panel according to claim 20, wherein the vibration includes two or more kinds of frequencies and either one or both of them is/are applied to at least one of the metal material and the glass sheets.

22. The manufacturing method of a glass panel according to claim 21, wherein the two or more kinds of vibrations having different frequencies of either a low frequency of 1 Hz to 10 kHz or a ultrasonic frequency of 15 to 100 kHz.

23. The manufacturing method of a glass panel according to claim 7, wherein the metal material contains not more than 0.1 wt. % or substantially zero wt. % of lead.

24. The manufacturing method of a glass panel according to claim 7, wherein the metal material contains two or more kinds of components selected from a group consisting of Sn, Zn, Al, Si and Ti.

25. The manufacturing method of a glass panel according to claim 7, wherein the metal material contains O (oxygen) in the range from 0.0001 to 1.5 wt. %.

26. The manufacturing method of a glass panel according to claim 7, wherein the gap is sealed so as to keep a depressurized condition.

* * * * *